Jan. 4, 1966    K. A. KOSBAB ETAL    3,227,488
SEAT ACTUATOR MECHANISM
Filed Aug. 7, 1964    4 Sheets-Sheet 1

INVENTORS
KENNETH A. KOSBAB
FRANK J. TERKOSKI
BY
W. E. Finke
THEIR ATTORNEY

INVENTORS
KENNETH A. KOSBAB
FRANK J. TERKOSKI
BY
W. E. Finke
THEIR ATTORNEY

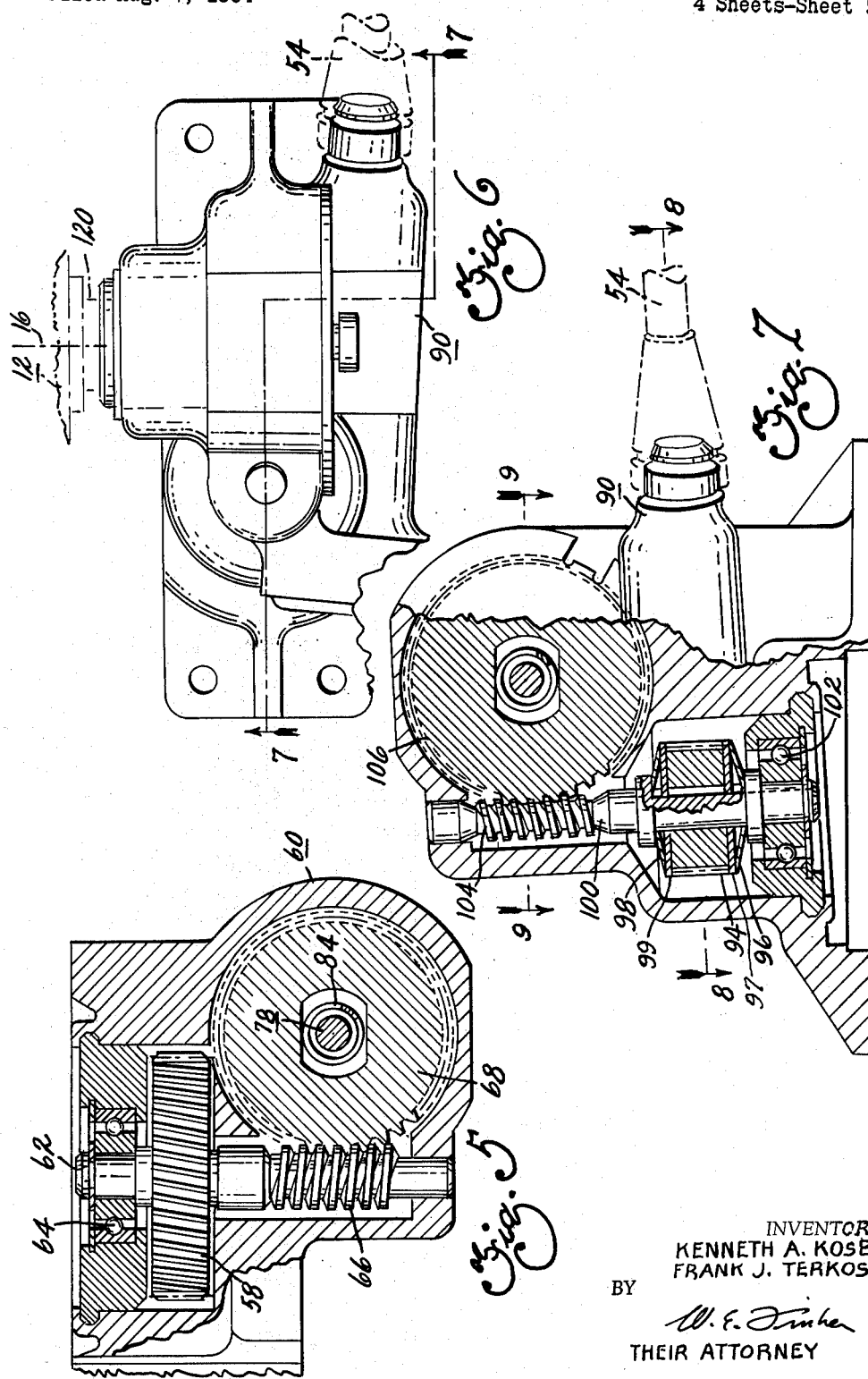

Jan. 4, 1966  K. A. KOSBAB ETAL  3,227,488
SEAT ACTUATOR MECHANISM
Filed Aug. 7, 1964  4 Sheets-Sheet 4

INVENTORS
KENNETH A. KOSBAB
FRANK J. TERKOSKI
BY
W. E. Finke
THEIR ATTORNEY

United States Patent Office 3,227,488
Patented Jan. 4, 1966

3,227,488
SEAT ACTUATOR MECHANISM
Kenneth A. Kosbab and Frank J. Terkoski, Rochester, N.Y., assignors to General Motors Corporation, Detroit, Mich., a corporation of Delaware
Filed Aug. 7, 1964, Ser. No. 388,088
5 Claims. (Cl. 297—330)

This invention pertains to motor vehicles, and particularly to actuating mechanisms for a two-part vehicle seat.

In present day station wagon-type motor vehicles having three seats, the third seat comprises a pivotally supported seat cushion and a pivotally supported back rest, both of which can be moved to a flat position to provide cargo space in the rear portion of the vehicle. At the present time both the seat cushion and the back rest are manually operably between cargo and passenger positions. The present invention relates to an electric motor driven actuating mechanism for imparting conjoint movement to the seat cushion and the back rest between their cargo and passenger carrying positions.

Accordingly, among my objects are the provisions of electric motor driven actuating mechanism for operating foldable seats of vehicles; still further provision of actuating mechanism including a single reversible motor for conjointly moving both a seat cushion and a back rest between cargo and passenger carrying positions; and the still further provision of actuating mechanism of the aforesaid type including releasable drive mechanism permitting manual actuation of the seats in the event of a malfunction in the electric motor drive train.

The aforementioned and other objects are accomplished in the present invention by utilizing a single reversible motor which is drivingly connected to both the seat cushion and the back rest through separate gear reduction units so as to conjointly move the seat cushion and the back rest at different rates of speed.

Further objects and advantages of the present invention will be apparent from the following description, reference being had to the accompanying drawings, wherein a preferred embodiment of the present invention is clearly shown and wherein similar numerals depict similar parts throughout the several views.

In the drawings:

FIGURE 5 is a fragmentary sectional view taken along line 5—5 of FIGURE 4.

FIGURE 6 is a plan view of the gear reduction unit for the seat cushion.

FIGURE 7 is a view, partly in section and partly in elevation, taken along line 7—7 of FIGURE 6.

Figure 8:
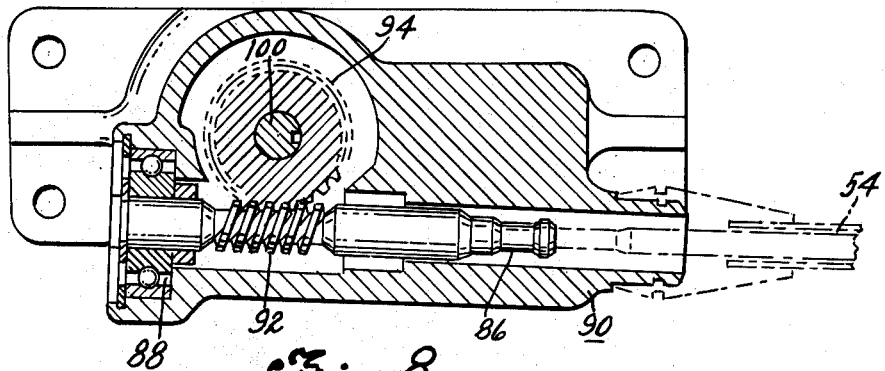
Figure 9:
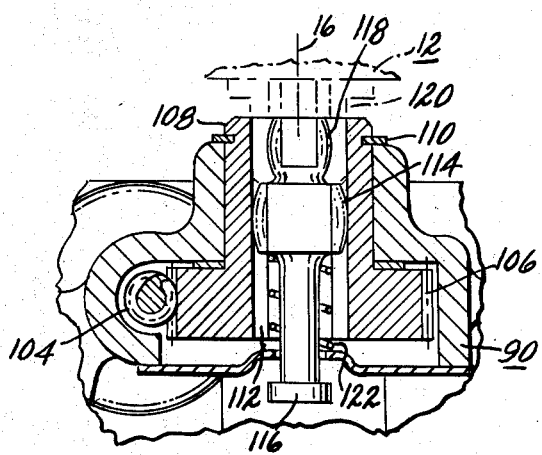

FIGURES 8 and 9 are sectional views taken along lines 8—8 and 9—9, respectively of FIGURE 7.

Figure 1:
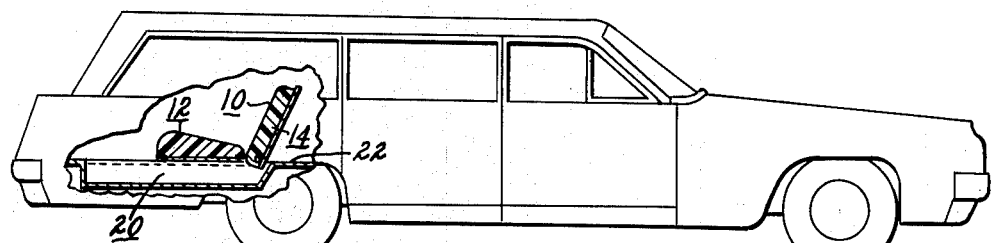
FIGURE 1 is a side view of a station wagon vehicle with certain portions broken away shown partly in section and partly in elevation.
Figure 2:
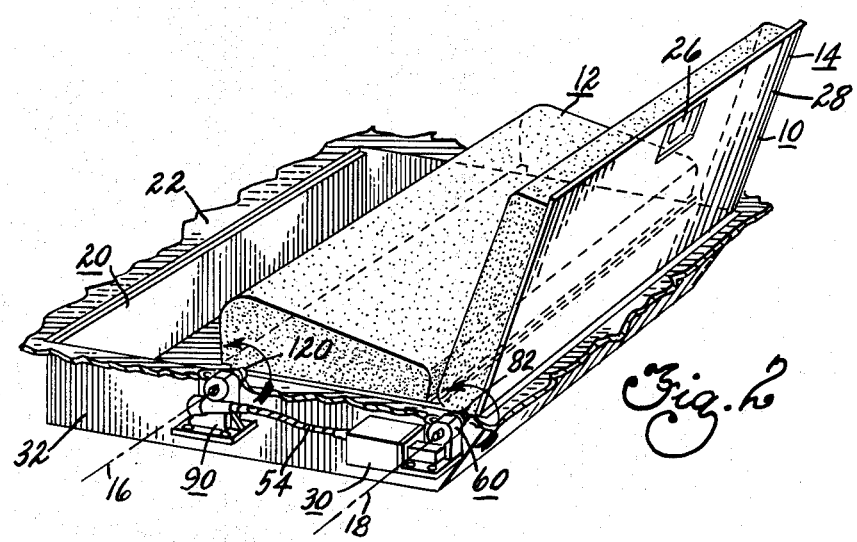
FIGURE 2 is a fragmentary perspective view of the third seat of a station wagon type vehicle shown in the passenger carrying position.
Figure 3:
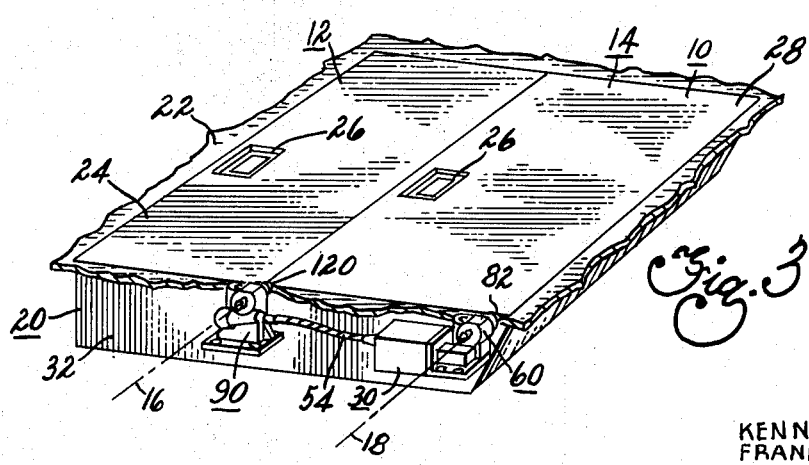
FIGURE 3 is a view similar to FIGURE 2 showing the third seat in the cargo carrying position.

Referring to FIGURES 1 through 3, a station wagon-type vehicle is shown having a third seat 10 in the rear portion thereof comprising a seat cushion 12 and a back rest 14. The seat cushion 12 is supported within the vehicle on a horizontal hinge axis 16 located adjacent the front edge of the seat cushion, and the back rest 14 is supported on a horizontal hinge axis 18 adjacent the lower edge thereof. Both the seat cushion 12 and the back rest 14 are mounted over a well 20 formed in the floor of the vehicle such that when the seat cushion 12 is rotated substantially 180° about the hinge axis 16 and the back rest 14 is rotated throughout an angle of substantially 105° about the hinge axis 18, both the seat cushion and back rest fit into the well 20 and form a substantially flat cargo carrying surface that is flush with the floor 22 in the rear portion of the vehicle. The bottom 24 of the seat cushion has a handle 26 formed therein as does the rear surface 28 of the back rest so as to provide means for manually moving the seat cushion and the back rest between its passenger and cargo carrying positions in the event of malfunction of the actuating system of the present invention.

Figure 4:
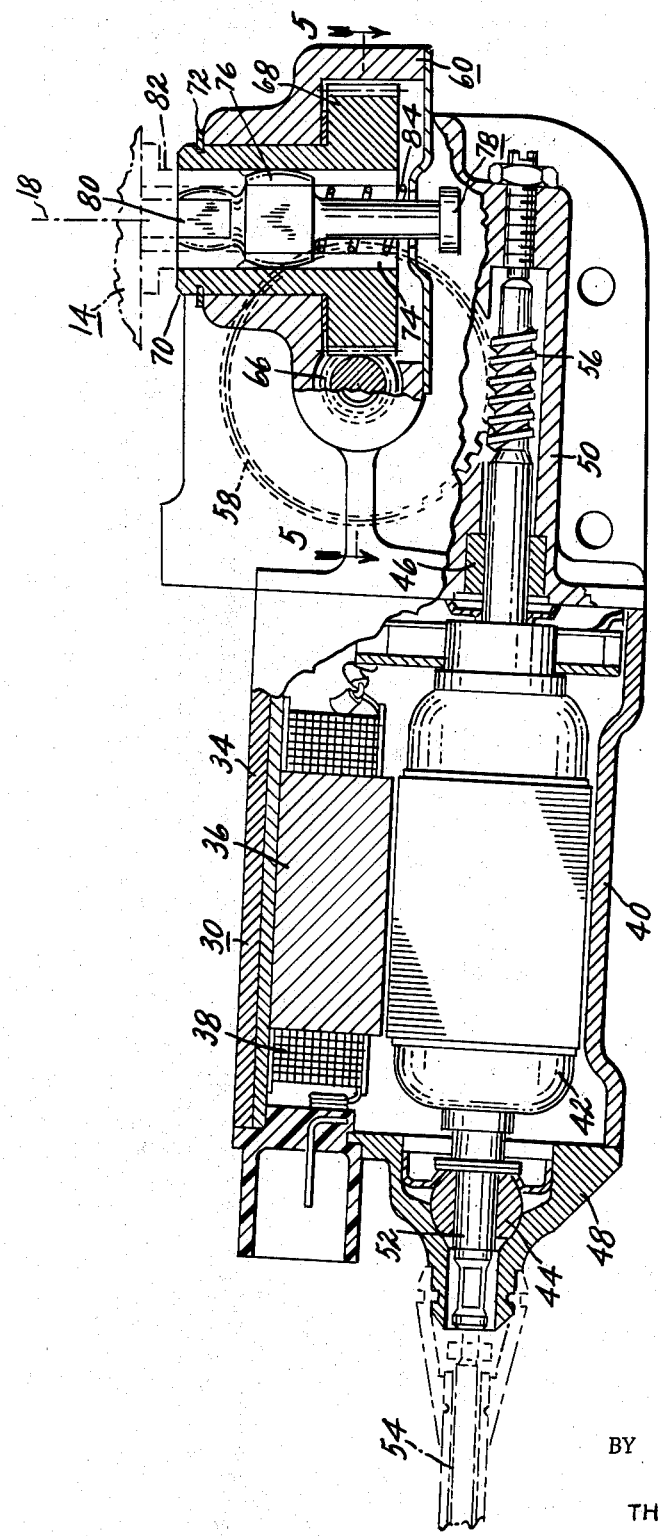
FIGURE 4 is a view partly in section and partly in elevation of the reversible electric motor and gear reduction unit for the back rest.

Referring particularly to FIGURES 2 through 4, a reversible direct current electric motor 30 is rigidly attached to the side wall 32 of the well, and as seen in FIGURE 4, the motor 30 comprises a frame 34 carrying a single pole piece 36 having a field coil 38 supported thereby. The frame 34 has a pole formation 40 diametrically opposite the pole piece 36. A wound armature 42 is rotatably supported by bearings 44 and 46 and end caps 48 and 50, respectively. The construction of the motor, per se, constitutes no part of this invention and may be of the type shown in Patent No. 3,021,444.

The wound armature 42 includes a shaft 52 which extends in both directions, the left-hand end of the shaft 52 being drivingly connected to a flexible shaft 54 shown in phantom in FIGURE 4. The right-hand end of the armature shaft 52 is formed with an integral worm 56 that meshes with a worm wheel 58 constituting a part of the gear reduction unit 60 for the back rest 14. As seen in FIGURE 5, the worm wheel 58 of the gear reduction unit 60 is attached to a stub shaft 62 rotatably supported at one end by ball bearing assembly 64 and having an integral worm 66 that meshes with a second worm wheel 68. Referring again to FIGURE 5, the worm wheel 68 includes a hub portion 70 journalled in the gear reduction housing which is constituted by the end cap 50 of the motor. The hub 70 is held against axial movement by a snap ring 72 and is formed with an obround hole 74 which mates with a comlementary part 76 formed on a coupler 78 having a coupling portion 80 engageable with a shaft 82 for rotating the back rest about its horizontal axis 18. The coupler 78 is normally maintained in driving engagement with shaft 82 by a coil spring 84. The coupler 78 can be manually withdrawn to disengage the coupling part 80 from the shaft 82 so as to permit manual operation of the back rest 14.

Referring to FIGURES 6 through 9, the flexible drive shaft 54 is drivingly connected with a stub shaft 86 journalled by ball bearing assembly 88 in a gear reduction housing 90. The stub shaft 86 has a worm 92 meshing with a worm wheel 94. The worm wheel 94 is connected by a slip clutch, to a stub shaft 100 journalled by ball bearing assembly 102 in the housing 90. The aforementioned slip clutch comprises a pair of clutch plates 97 and 99 on opposite sides of the worm wheel 94, which clutch plates are keyed to the shaft 100 and are maintained in frictional engagement with the worm wheel 94 by a pair of oppositely acting Belleville springs 96 and 98. The stub shaft 100 has a worm 104 meshing with a worm wheel 106 which, as seen in FIGURE 9, has a hub 108 journalled in the housing 90 and restrained against axial movement by a snap ring 110. The hub 108 is likewise formed with an obround hole 112 for receiving a coupling part 114 of a coupler 116 having a second coupling part 118 adapted to drivingly engage a shaft 120 for pivoting the seat cushion 12 about the horizontal axis 16. The coupler 116 is likewise normally maintained in driving engagement with the shaft 120 by a coil spring 122 but can be withdrawn to permit manual operation of the seat cushion.

The gear reduction unit for the seat cushion moves the seat cushion at twice the speed of the back rest since the seat cushion must rotate approximately 180° while the back rest only has to rotate approximately 105°. Thus, according to the present invention, the speed of seat cushion rotation may be 4 r.p.m. and the speed of the back rest rotation may be 2 r.p.m., and this arrangement permits a single reversible electric motor to drive both parts of the seat without interference. The slip clutch in the gear reduction unit of the seat cushion is provided to prevent the motor from stalling if the seat cushion reaches its flat position as shown in FIGURE 3 before the back rest.

In operation, with the seat parts in the passenger carrying position of FIGURE 2, energization of the motor 30 in one direction will conjointly rotate the seat cushion 12 and the back rest 14 to the positions shown in FIGURE 3, and upon energization of the motor 30 in the reverse direction the seat cushion and seat back will be returned to the positions of FIGURE 2. If there is a malfunction in the actuating system for any reason such as jamming of gears, etc., the couplers 78 and 116 can be manually withdrawn from their respective shafts 82 and 120 and both the seat cushion and the back rest can be manually manipulated between their passenger and cargo carrying positions.

While the embodiment of the invention as herein disclosed constitutes a preferred form, it is to be understood that other forms might be adopted.

What is claimed is as follows:

1. Actuating mechanism for a foldable vehicle seat comprising a pivotally mounted seat cushion and a pivotally mounted back rest including, reversible rotary power means, a first gear reduction unit connected to said rotary power means, releasable drive means connecting said first gear reduction unit with said back rest for imparting pivotal movement thereto between upright and flat positions, a second gear reduction unit connected to said power means, and drive means connecting said second gear reduction unit and said seat cushion for imparting pivotal movement to said seat cushion between passenger carrying and cargo carrying positions, said first and second gear reduction units being constructed so as to conjointly actuate said back rest and seat cushion at different rates of movement upon operation of said power means, both of said drive means being manually releasable to permit manual actuation of said seat cushion and said back rest.

2. Actuating mechanism for a foldable vehicle seat comprising a pivotally mounted seat cushion and a pivotally mounted back rest including, a reversible electric motor, a first gear reduction unit connected to said motor, a second gear reduction unit connected to said motor and having an output speed substantially twice the output speed of the first gear reduction unit, first manually releasable drive means connecting said first gear reduction unit to said back rest for imparting pivotal movement thereto between upright and flat positions, said first releasable drive means comprising a spring loaded coupler, and second drive means connecting said second gear reduction unit and said seat cushion for imparting pivotal movement thereto between passenger and cargo carrying positions, said first and second drive means being conjointly actuated upon energization of said electric motor.

3. Actuating mechanism for a foldable vehicle seat comprising a pivotally mounted seat cushion and a pivotally mounted back rest including, a reversible electric motor, a first gear reduction unit connected to said motor, a second gear reduction unit connected to said motor by a flexible cable and having an output speed substantially twice the output speed of the first gear reduction unit, first releasable drive means connecting said first gear reduction unit with said back rest for imparting pivotal movement thereto between upright and flat positions, and second manually releasable drive means connecting said second gear reduction unit and said seat cushion for imparting pivotal movement thereto between passenger and cargo carrying positions, said second drive means comprising a spring loaded coupler, said first and second drive means being conjointly actuated upon energization of said electric motor.

4. Actuating mechanism for a foldable vehicle seat comprising a pivotally mounted seat cushion and a pivotally mounted back rest including, a reciprocable electric motor, a first gear reduction unit connected to said motor including a worm wheel having a hub with an obround hole, a second gear reduction unit connected to said motor and having an output speed substantially twice the output speed of said first gear reduction unit, first releasable drive means connecting said first gear reduction unit with said back rest for imparting pivotal movement thereto between upright and flat positions, said first releasable drive means comprising a spring loaded coupler reciprocably mounted within the hub of said worm wheel having an obround part complementary to the obround hole in the hub of said worm wheel and a coupling portion engageable with said back rest, and second drive means connecting said second gear reduction unit and said seat cushion for imparting pivotal movement thereto between passenger and cargo carrying positions, said first and second drive means being conjointly actuated upon energization of said electric motor.

5. Actuating mechanism for a foldable vehicle seat comprising a pivotally mounted seat cushion and a pivotally mounted back rest including, a reversible electric motor, a first gear reduction unit connected to said motor, drive means connecting said first gear reduction unit with said back rest for imparting pivotal movement thereto between upright and flat positions, a second gear reduction unit connected to said motor including a slip clutch, and drive means connecting said second gear reduction unit and said seat cushion for imparting pivotal movement thereto between passenger carrying and cargo carrying positions, said first and second gear reduction units being constructed so as to conjointly actuate said back rest throughout an angle of substantially 105° and said seat cushion throughout an angle of substantially 180° at different rates of movement upon energization of said electric motor, said slip clutch permitting continued operation of said electric motor and movement of said back rest when movement of said seat cushion is arrested.

References Cited by the Examiner

UNITED STATES PATENTS

| | | | |
|---|---|---|---|
| 2,468,182 | 4/1949 | Dempsey | 64—23 |
| 2,502,061 | 3/1950 | Rodford | 296—66 |
| 2,726,524 | 12/1955 | Gorin | 287—53 |
| 2,778,209 | 1/1957 | Wilson | 64—23.5 |
| 2,888,296 | 5/1959 | Huggins | 296—65 |
| 2,942,647 | 6/1960 | Pickles | 297—330 |
| 2,982,335 | 5/1961 | Garvey | 296—65 |
| 3,040,851 | 6/1962 | Iding | 74—16 |
| 3,066,907 | 12/1962 | Latimer et al. | 296—65 |

FRANK B. SHERRY, *Primary Examiner.*

F. K. ZUGEL, *Assistant Examiner.*